Patented Aug. 21, 1928.

1,681,599

UNITED STATES PATENT OFFICE.

JOSEF STOCK, OF HOCHST-ON-THE-MAIN, GERMANY, ASSIGNOR TO GRASSELLI DYE-STUFF CORPORATION, OF NEW YORK, N. Y., A CORPORATION OF DELAWARE.

NITRO-2.3-DICHLOR-1.4-NAPHTHOQUINONE AND PROCESS OF PREPARING THE SAME.

No Drawing. Application filed November 30, 1927, Serial No. 236,874, and in Germany March 27, 1925.

My present invention relates to a nitro-2.3-dichlor-1.4-naphthoquinone and process of preparing the same.

1.4-naphthoquinone and also 2.3-dichlor-1.4-naphthoquinone when treated with nitric acid are not transformed, as it could have been expected, into nitro-derivatives, but by the oxidizing action of the nitric acid into phthalic acid (see Richter, Organische Chemie 1913, vol. 2, page 143, and Graebe, Liebigs Annalen, vol. 149, page 5).

I have now found that nitro-derivatives of the 2.3-dichlor-1.4-naphthoquinone are obtained by causing nitri-sulfuric acid to act upon 2.3-dichlornaphthoquinone at an elevated temperature which may vary between the ordinary temperature and about 60° C., preferably one between 30° C. and 60° C.

This fact is all the more surprising as in the 1.4-napthoquinone the benzene ring linked to the quinone nucleus has a great resisting power to the introduction of acid substituents. Thus, if 1.4-naphthoquinone is thoroughly chlorinated in boiling glacial acetic acid by means of an excess of chlorine and iodine as carrier, the reaction ceases after the introducion of two chlorine atoms;—the latter enter the quinone nucleus with formation of 2.3-dichlor-1.4-naphthoquinone (Berichte der Deutschen Chemischen Gesellschaft vol. 34, page 1554) while the benzene nucleus remains unsubstituted.

The following examples serve to illustrate my invention, but they are not intended to limit it thereto; the parts being by weight:—

(1) One part of 2.3-dichlor-1.4-naphtho-quinone is heated with about 10 parts of nitric-sulfuric acid containing 30% of nitric acid for a short time to about 40° C. to 50° C. Even on gradually cooling, part of the nitro-product which has been formed separates as light-yellow needles. In order to separate this product completely the reaction-mixture is poured into ice-water. The precipitate is filtered by suction, washed and dried. The crude product forms a light-yellow crystalline powder intermixed with coarse needle and the melting point of which lies about 130° C. to 140° C. Its yield amounts to 90-95% of the theory. The nitro dichlornaphtho-quinone is obtained in a pure state by recrystallizing the crude product from glacial acetic acid or alcohol. The substance crystallizes out of the said two solvents in two different crystalline forms, either as light-yellow needles or as yellow laminæ. These two forms are chemically equivalent; they have one and the same melting point and, when mixed with each other, their melting point is not lowered. The melting point of the pure compound lies at 175° C. The product constitutes most probably a 2.3-dichlor-8-nitro-1.4-naphthoquinone which can be utilized particularly as intermediate product for the manufacture of vat-dyestuffs.

(2) If the nitric-sulfuric acid containing 30% of nitric acid, as used in Example 1, is replaced by an acid containing a higher percentage, for instance 90%, of nitric acid and if otherwise the procedure of Example 1 is followed, a crude product having a melting point of about 140° C. to 145° C. is obtained. By recrystallizing the latter from alcohol or glacial acetic acid, a pure product is obtained possessing the properties of that obtainable according to Example 1.

I claim:

1. The process of preparing a nitro-2.3-dichlor-1.4-naphthoquinone of the following formula:

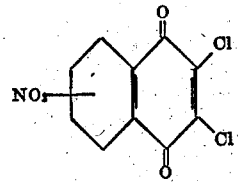

which consists in causing nitric-sulfuric acid to act upon 2.3-chlor-1.4-naphthoquinone at a temperature which may be varied between the ordinary temperature and 60° C.

2. The process of preparing a nitro-2.3-dichlor-1.4-naphthoquinone of the following formula:

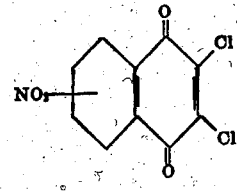

which consists in causing nitric-sulfuric acid to act upon 2.3-chlor-1.4-naphthoquinone at a temperature which may be varied between 30° C. and 60° C.

3. The process of preparing a nitro-2.3-dichlor-1.4-naphthoquinone of the following formula:

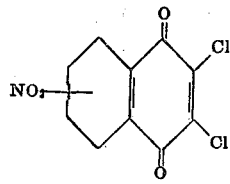

which consists in causing nitric-sulfuric acid to act upon 2.3-chlor-1.4-naphthoquinone at a temperature between 40° C. and 50° C.

4. The process of preparing a nitro-2.3-dichlor-1.4-naphthoquinone of the following formula:

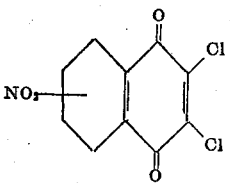

which consists in causing nitric-sulfuric acid containing 30% of nitric acid to act upon 2.3-chlor-1.4-naphthoquinone at a temperature which may be varied between the ordinary temperature and 60° C. for a short time.

5. The process of preparing a nitro-2.3-dichlor-1.4-naphthoquinone of the following formula:

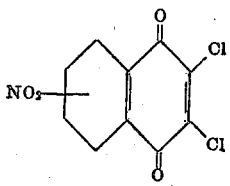

which consists in causing nitric-sulfuric acid containing 30% of nitric acid to act upon 2.3-chlor-1.4-naphthoquinone at a temperature which may be varied between 30° C. and 60° C. for a short time.

6. The process of preparing a nitro-2.3-dichlor-1.4-naphthoquinone of the following formula:

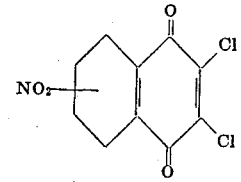

which consists in causing nitric-sulfuric acid containing 30% of nitric acid to act upon 2.3-chlor-1.4-naphthoquinone at a temperature between 40° C. and 50° C. for a short time.

7. As a new product, the compound of the following formula:

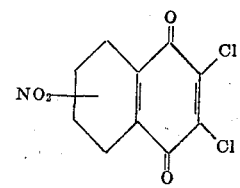

which when recrystallized from glacial acetic acid or alcohol forms crystals melting at 175° C.

In testimony whereof, I affix my signature.

JOSEF STOCK.